(12) United States Patent
Magnin et al.

(10) Patent No.: US 7,942,441 B2
(45) Date of Patent: May 17, 2011

(54) GAS FLOW DISTRIBUTOR FOR AN AIRBAG MODULE

(75) Inventors: Carlo Magnin, Königsbronn (DE); Holger Rist, Dornstadt (DE); Nico Schneider, Jöhstadt (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/591,492

(22) Filed: Nov. 20, 2009

(65) Prior Publication Data
US 2010/0164209 A1 Jul. 1, 2010

Related U.S. Application Data

(63) Continuation of application No. PCT/EP2008/056326, filed on May 22, 2008.

(30) Foreign Application Priority Data

May 22, 2007 (DE) ..................... 20 2007 007 355 U

(51) Int. Cl.
*B60R 21/26* (2011.01)
(52) U.S. Cl. ...................................... 280/740
(58) Field of Classification Search .................. 280/729, 280/730.2, 740, 742, 743.1
See application file for complete search history.

(56) References Cited

U.S. PATENT DOCUMENTS

| | | | |
|---|---|---|---|
| 5,944,342 A | 8/1999 | White et al. | |
| 6,135,493 A | 10/2000 | Jost et al. | |
| 6,334,625 B1 | 1/2002 | Pausch et al. | |
| 6,361,067 B1 | 3/2002 | Varcus et al. | |
| 6,811,184 B2 | 11/2004 | Ikeda et al. | |
| 6,866,293 B2 | 3/2005 | Ogata | |
| 6,945,556 B2 | 9/2005 | Maertens | |
| 6,962,364 B2 * | 11/2005 | Ju et al. | 280/730.2 |
| 7,654,567 B2 * | 2/2010 | Taylor et al. | 280/740 |
| 2001/0019201 A1 | 9/2001 | Masuda et al. | |
| 2004/0032116 A1 | 2/2004 | Steinbruck et al. | |
| 2004/0104563 A1 | 6/2004 | Fischer | |
| 2004/0188987 A1 * | 9/2004 | Salmo et al. | 280/729 |
| 2005/0052008 A1 | 3/2005 | Rose et al. | |
| 2005/0087959 A1 | 4/2005 | Heuschmid et al. | |
| 2006/0108778 A1 | 5/2006 | Ochiai et al. | |
| 2006/0163849 A1 | 7/2006 | Keshavaraj | |
| 2006/0255570 A1 | 11/2006 | Wipasuramonton et al. | |
| 2007/0145730 A1 * | 6/2007 | Choi | 280/740 |
| 2008/0012274 A1 | 1/2008 | Zauritz et al. | |

FOREIGN PATENT DOCUMENTS

DE 10 198 48 592 A1 6/1999
(Continued)

*Primary Examiner* — Paul N Dickson
*Assistant Examiner* — Robert A Coker
(74) *Attorney, Agent, or Firm* — Foley & Lardner LLP

(57) ABSTRACT

A gas flow distributor for an airbag module for the specific distribution of a gas flow through which the released gas flows during inflation of the airbag is provided. The gas flow distributor comprises at least two sleeve parts which are made of a flexible material and are connected to one another by a seam. The seam absorbs the forces which are exerted on the sleeve by the gas flowing through it. An additional releasable connection of both sleeve parts is provided in at least some sections in order to absorb the forces exerted by the gas on the sleeve, wherein the additional connection cooperates with the sleeve for limiting the forces to be absorbed by the seam in such a manner that said connection is released when gas passes through the sleeve.

18 Claims, 5 Drawing Sheets

FOREIGN PATENT DOCUMENTS

| | | |
|---|---|---|
| DE | 198 24 601 A1 | 12/1999 |
| DE | 101 64 519 A1 | 5/2003 |
| DE | 10 2005 005 964 A1 | 8/2006 |
| DE | 10 2005 015 078 A1 | 10/2006 |
| DE | 203 21 395 U1 | 3/2007 |
| EP | 1 013 514 A2 | 6/2000 |
| EP | 1 310 049 A2 | 5/2003 |
| EP | 1 314 618 A2 | 5/2003 |
| EP | 1 373 029 B1 | 1/2004 |
| EP | 1 462 321 A1 | 9/2004 |
| JP | 2002-187517 | 7/2002 |
| JP | 2003-146174 A | 5/2003 |
| JP | 2006-117109 | 5/2006 |
| WO | WO 00/20260 A1 | 4/2000 |
| WO | WO 2006/092226 A2 | 9/2006 |
| WO | WO 2007/078500 A2 | 7/2007 |

* cited by examiner

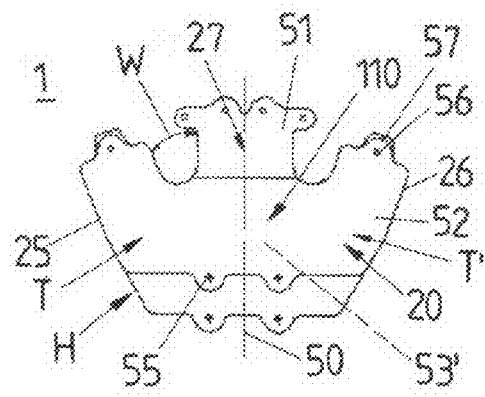
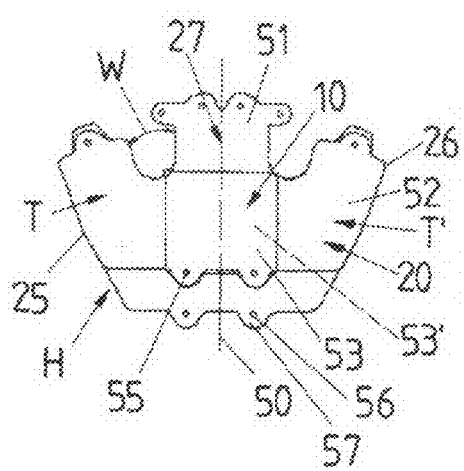
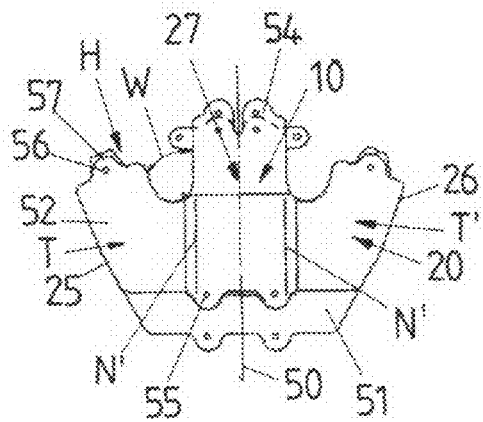
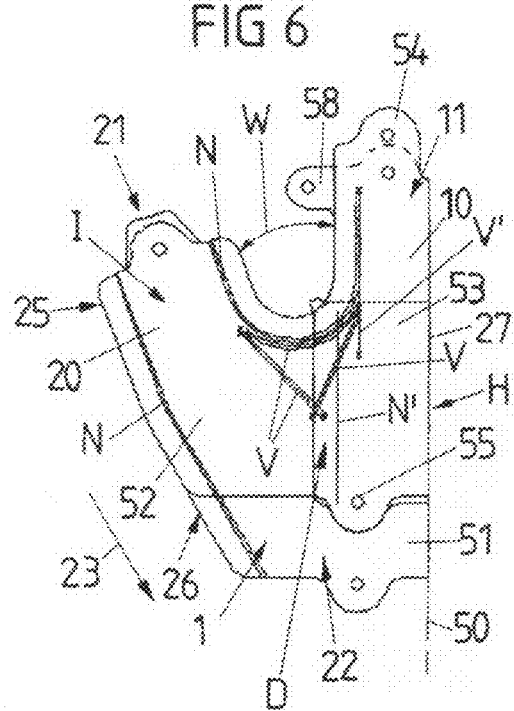

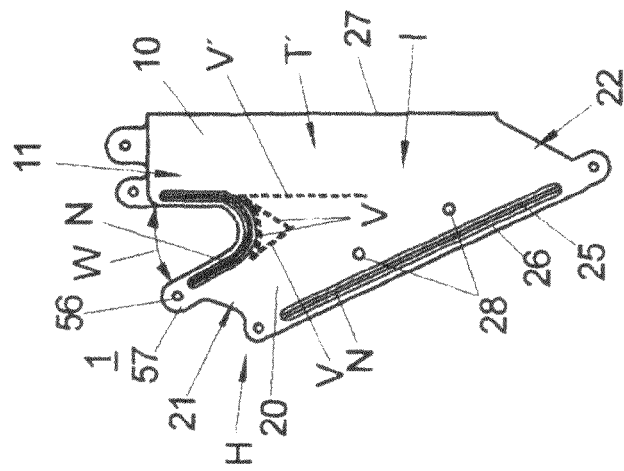
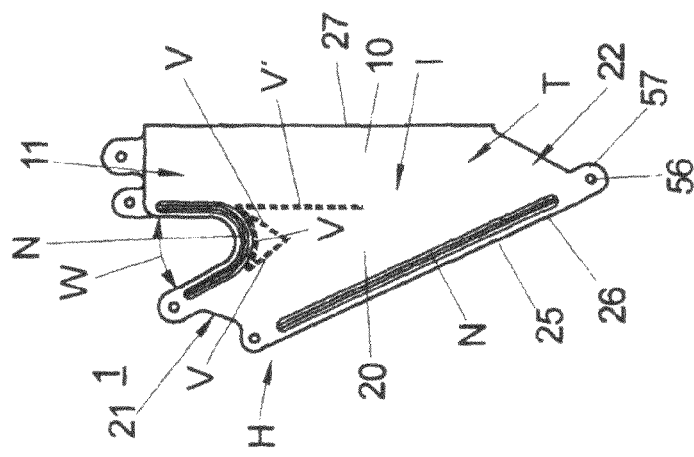
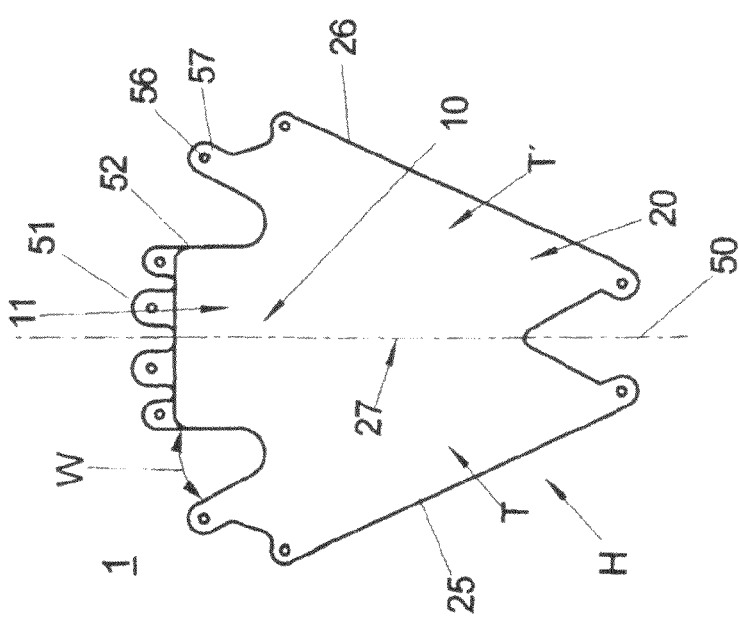

GAS FLOW DISTRIBUTOR FOR AN AIRBAG MODULE

CROSS-REFERENCE TO RELATED PATENT APPLICATIONS

This application is a Continuation of International Application No. PCT/EP2008/056326, filed May 22, 2008, which was published in German on Nov. 27, 2008 as WO 2008/142142 A1. The foregoing International Application is incorporated herein by reference in its entirety.

BACKGROUND

The invention relates to a gas flow distributor.

Such a gas flow distributor serves for distributing gas upon inflation of an airbag. Thereby, gas leaving the gas generator can be deflected predominantly only in one direction or several gas flows are formed that can escape from the gas flow distributor in different directions. The gas flow distributor comprises a flexible sleeve through which gas to be distributed flows upon inflation of the airbag, and which sleeve is formed by at least two sleeve parts of a flexible material that are connected to each other by an enduring seam. Upon the flowing of gas through the sleeve, the latter expands due to the gas pressure, so that forces act on the sleeve, which are taken up by said seam.

SUMMARY

The problem underlying the invention is to improve a gas flow distributor of the kind mentioned at the beginning.

According to an exemplary embodiment of the invention, an additional releasable connection of the two sleeve parts is provided for receiving the forces exerted on the sleeve, wherein the additional connection cooperates with the sleeve in order to limit the forces to be taken up by the seam in a way that said connection is released when gas flows through the sleeve. Exemplary, the additional releasable connection extends in sections along the seam.

The additional connection of the two sleeve parts is—as seen from an internal space of the gas flow distributor surrounded by the sleeve—exemplary arranged in front of a section of the seam connecting the two sleeve parts, so that in the region of the additional releasable connection forces acting on the sleeve due to the gas pressure are at first induced into the releasable connection which is hereby released. After releasing, the actual connection of the two sleeve parts of the sleeve in the form of an enduring seam takes up said forces. However, the enduring seam must not take up the initially acting force peaks upon inflation of the airbag due to explosive gas generation by the gas generator. These force peaks are absorbed by the releasable connection.

It is of course also possible to provide more than one additional (releasable) connection. Also, kind and course of the additional releasable connection can be adapted to the specific circumstances.

For receiving a gas generator, the sleeve comprises a first section into which the gas generator can be inserted through an insertion opening of the first section, so that the gas outlet ports of the gas generator are arranged in said first section of the sleeve. Thereby, the insertion opening is exemplary formed by an interruption of the seam, which holds the two sleeve parts together, so that the two sleeve parts respectively form a boundary section of the insertion opening.

The first section is connected via a transition region to a second section of the sleeve, which is adapted and provided to be arranged in an internal space of an airbag, which internal space can be filled with gas. Here, the airbag can be e.g. a side airbag, which can be deployed curtain-like in front of a lateral body region of a motor vehicle for protecting a person.

For distributing gas, the second section of the sleeve exemplary comprises two opposing exhaust ports, through which gas can be discharged into an airbag in opposite directions.

In an exemplary variant of the invention, the second section of the sleeve longitudinally extends along an extension direction, wherein the two exhaust ports are exemplary facing each other along the extension direction. Exemplary, the exhaust ports are formed by interruptions of the seam by means of which the circumferential boundary regions of the two sleeve parts are connected to each other.

In a further exemplary variant of the invention, the sleeve is influenced concerning its shape by the releasable connection in a way, that before a release of said connection the majority of the gas flowing through the sleeve leaves the gas flow distributor through one of the two exhaust ports, i.e., the gas flow is at first directed by the gas flow distributor due to the releasable connection in a way, that the gas flow comprises a preferred direction (thereby more gas flows through the one exhaust port than through the other one).

In order that the gas generator takes as possible only a little installation space, in one exemplary variant of the invention provision is made for a first section of the sleeve that runs into a second section of the sleeve under an acute angle. Thereby, it is provided that the additional releasable connection connects the two sleeve parts in a transition region of the sleeve at which the first section of the sleeve runs into the second section of the sleeve, i.e., at least one part or a section of said releasable connection of the two sleeve parts runs starting from the first section into the second section. Here, the additional releasable connection exemplary enforces the part of the seam that (due to the acute-angled running of the first section into the second section) encloses said acute angle. Or, in other words, the seam connecting the sleeve parts runs along sides of the first and the second section facing each other, wherein said sides enclose the acute angle between the two sections of the sleeve. The correspondingly curved section of the seam is enforced by the at least one additional releasable connection, which thereby narrows the transition region between the two sections, through which gas can flow from the first section into the second section of the sleeve. By means of releasing the additional connection upon inflation, the transition region is expanded with respect to its cross section.

In an exemplary variant of the invention, the releasable connection is formed by at least one tear seam which runs at least in sections along the seam. The releasable connection can also be formed by a silicone line (adhering).

Generally, a connection means for providing the releasable connection comprises at least two material regions that are connected to each other in a releasable manner, which material regions upon introducing a force pre-tensioning the material regions in opposite directions are separated from each other, so that the connection between the two sleeve parts is released.

The enduring seam may also be provided by different connections means. Exemplary, said seam is a seam that was sewn (sewn seam), a glue line, or a welded seam.

The two sleeve parts respectively consists of at least one layer of a flexible material and are connected to each other along their outer boundaries by means of the seam. Exemplary, the flexible material is a flammable material, so that in case of a fire the thrust neutrality of the unit gas generator/gas flow distributor can be assured. Thereby, the material can be a fabric, a knitted fabric or any other flexible area-measured material.

Exemplary, the two sleeve parts are in sections integrally connected to one another, so that the two sleeve parts can be folded onto each other along a fold axis for forming the sleeve. Thereby, the two sleeve parts defined by the fold axis are exemplary formed mirror symmetrically with respect to the fold axis. I.e., it is conceivable that the gas flow distributor is composed out of a single connected sleeve part having two integrally connected halves, which are folded onto each other for forming the sleeve of the gas flow distributor.

In an exemplary variant of the invention, each sleeve part comprises two layers of a flexible material, wherein the two layers are exemplary formed congruent.

In another exemplary embodiment of the invention, each sleeve part is composed of at least four layers lying on top of each other, so that the sleeve parts are formed four-ply at least in the region of the gas outlet ports of a gas generator. Here, at least some of the layers lying on top of each other can become smaller with respect to surface area towards the internal space of the gas flow distributor, so that on the one hand material is saved and on the other hand the weight of the gas flow distributors is optimized.

In a further exemplary variant of the invention the sleeve part is exemplary composed out of five layers lying on top of each other. Here, exemplary at least two layers are formed congruent, namely the two layers being the smallest with respect to surface area, which are exemplary arranged in the region of the gas outlet ports of the gas generator.

In order that the layers can be positioned reproducibly during production of the gas flow distributor, the layers exemplary comprise a through-opening, respectively, wherein the through-openings are aligned with each other when said layers take their intended positions with respect to each other. The through-openings can be engaged by a suitable tool for positioning and aligning the layers during production of the gas flow distributor.

In order that no gas can escape through said through-openings of the gas flow distributor into the airbag, the through-openings comprise a corresponding small diameter and are exemplary arranged at the sleeve in a way, that they are covered by an airbag layer of the airbag in a state in which the gas flow distributor is arranged in an airbag as intended. Therefore, upon inflation of the airbag no gas can escape out of the gas flow distributor through said through-openings into the airbag.

Furthermore, in an exemplary variant of the invention, at least one additional exhaust port is provided at the second section, through which gas can escape across the extension direction of the second section out of the second section into the internal space of the airbag.

Furthermore, a further idea of the invention consists in providing an airbag module, particularly a side airbag module having a gas flow distributor according to the invention.

BRIEF DESCRIPTION OF THE DRAWINGS

In the following, the present invention is described in more detail with reference to embodiments shown in the Figures.

FIG. 3 shows the design of the gas flow distributor according to the invention of FIGS. 1 and 2.

FIG. 4 shows the design of the gas flow distributor according to the invention of FIGS. 1 and 2.

FIG. 5 shows the design of the gas flow distributor according to the invention of FIGS. 1 and 2.

FIG. 6 shows the design of the gas flow distributor according to the invention of FIGS. 1 and 2.

FIG. 8 shows the design of the gas flow distributor shown in FIG. 7.

FIG. 9 shows the design of the gas flow distributor shown in FIG. 7.

FIG. 10 shows the design of the gas flow distributor shown in FIG. 7.

DETAILED DESCRIPTION

Figure 1:
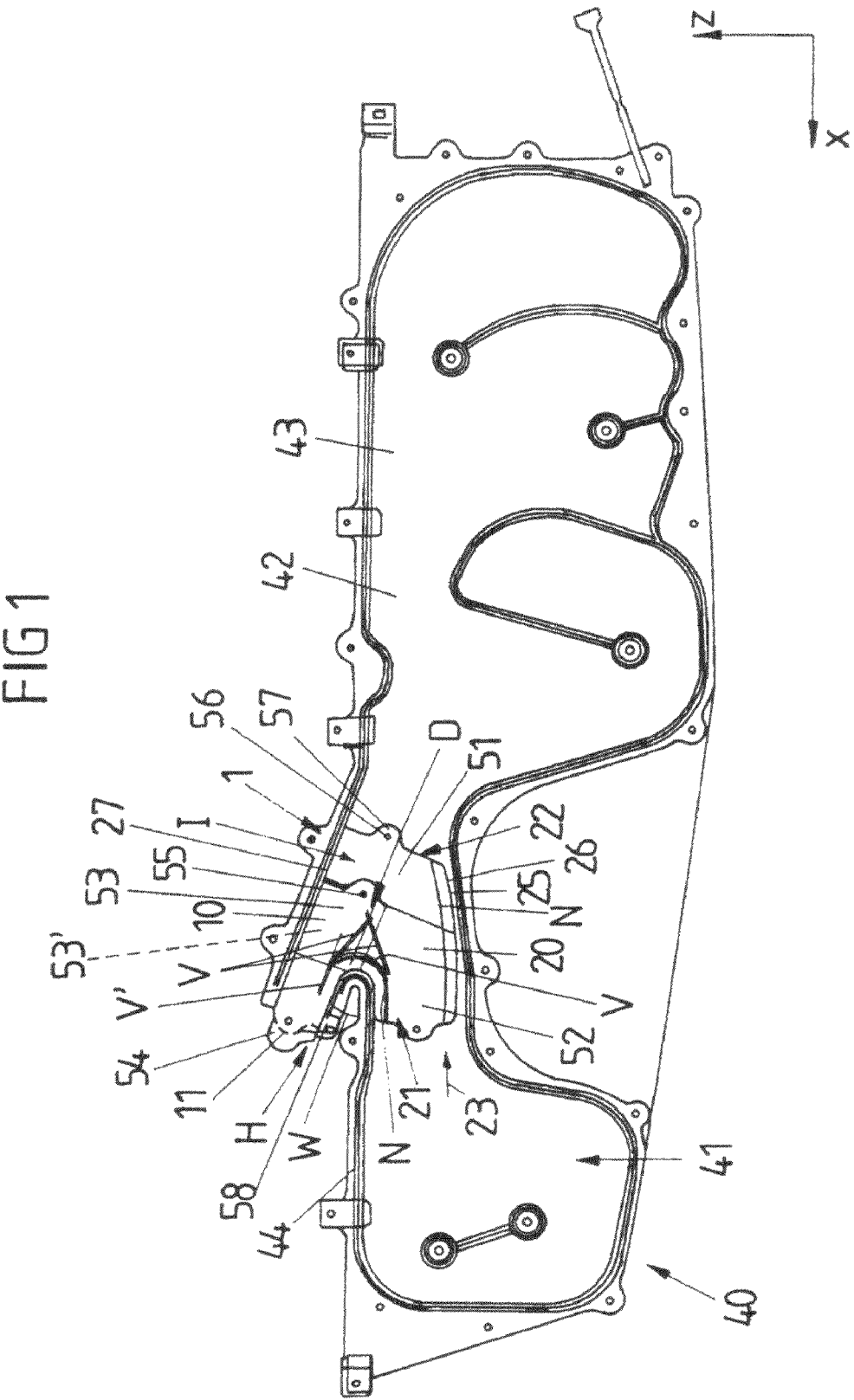
FIG. 1 shows a plan view onto a side airbag having a gas flow distributor according to the invention.
Figure 2:
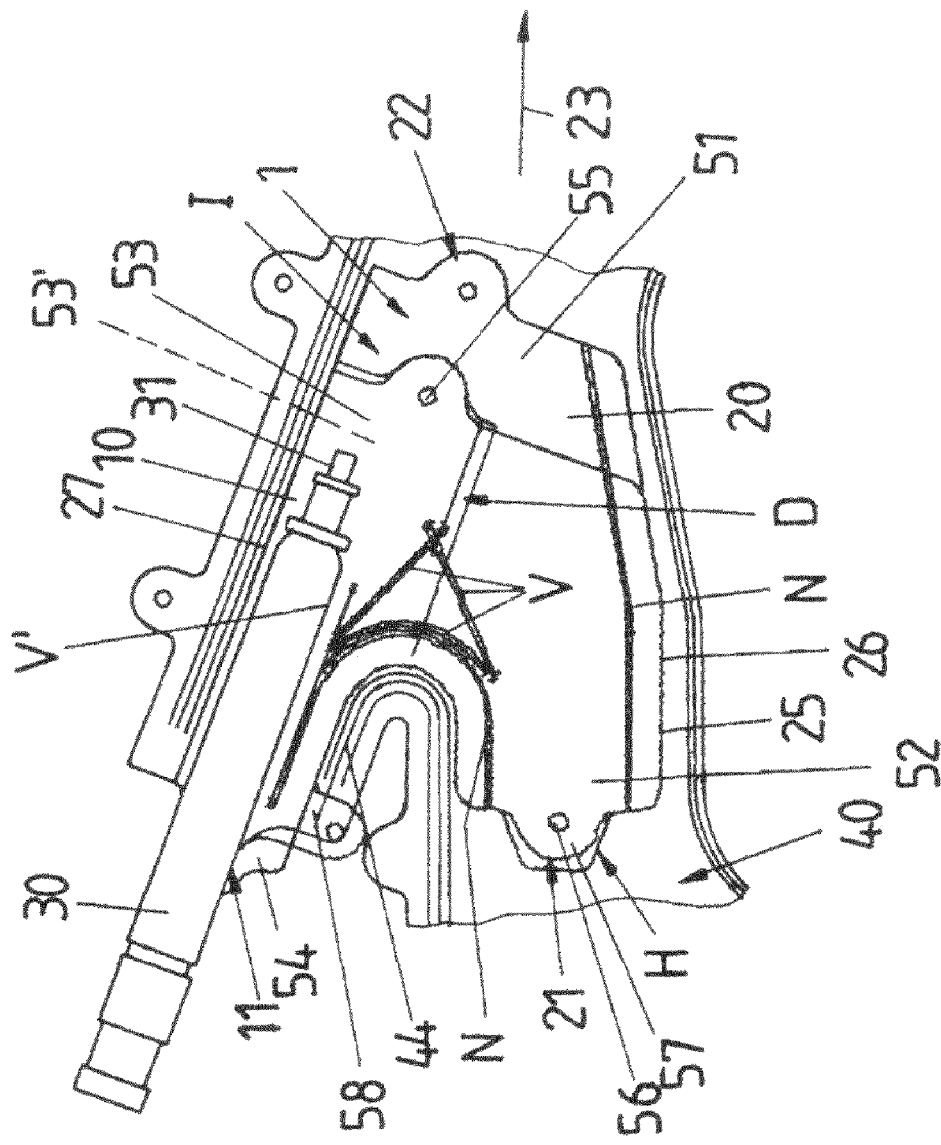
FIG. 2 shows a detail of FIG. 1.
Figure 7:
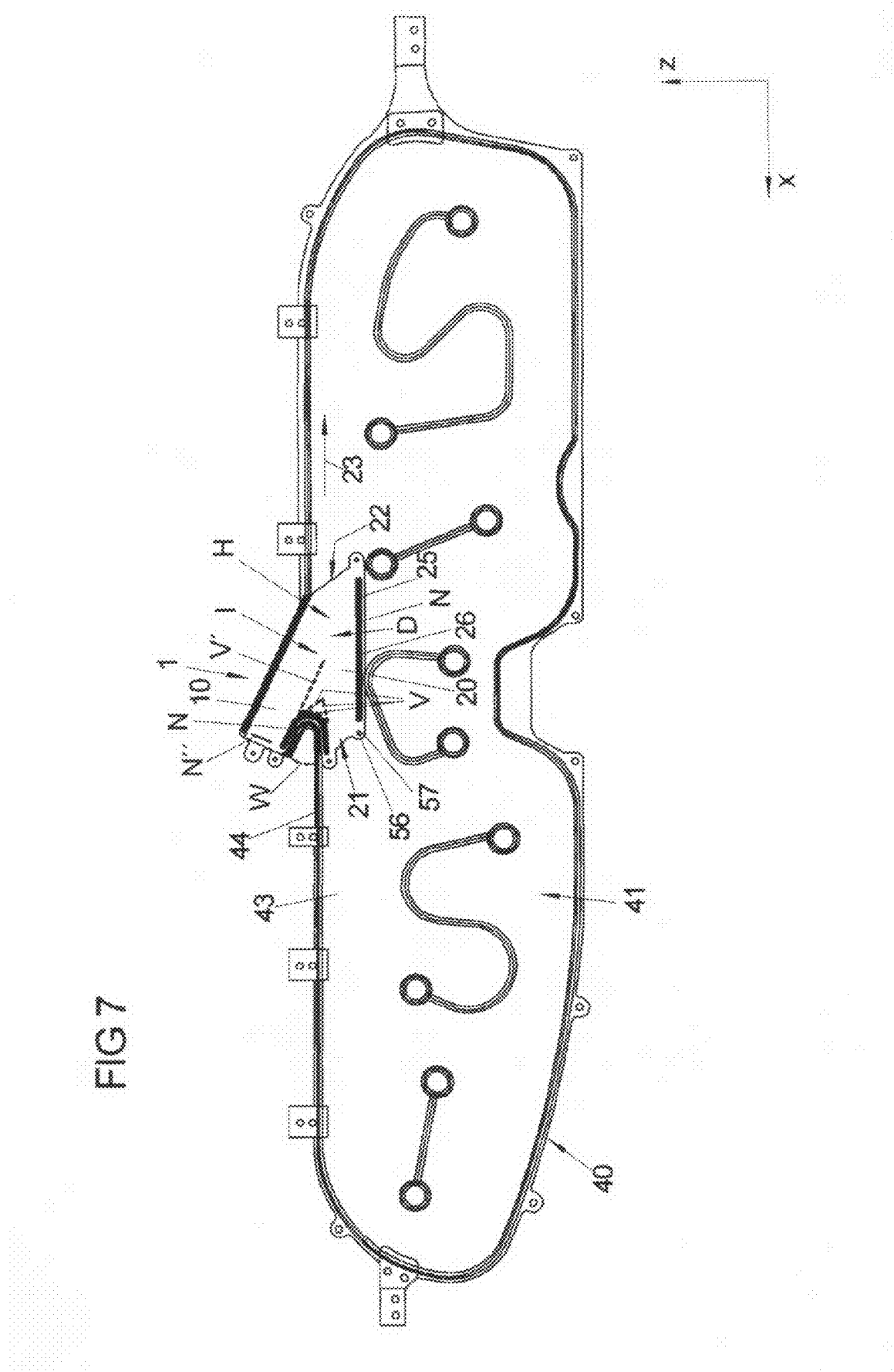
FIG. 7 shows a plan view onto a further side airbag having a gas flow distributor, which is a modification of the gas flow distributor shown in FIGS. 1 to 6.

FIG. 1 shows in conjunction with the FIGS. 2 to 6 a plan view onto an airbag in the form of a side airbag 40 in an evenly outspread state, which can be inflated by means of a gas generator in the form of a longitudinally extending tubular gas generator 30 in a curtain-like manner in front of a lateral body of a motor vehicle in order to protect a person against a side crash, namely in particular in front of the lateral windows of the motor vehicle. Thereby, the gas generator 30 radially discharges gas through gas outlet ports 31 provided at the periphery of the gas generator 30 and thus behaves thrust neutral upon discharging gas. The airbag 40 is composed out of two airbag parts whose circumferential boundaries are connected to each other by means of a peripheral seam 44 of the airbag 40 for forming a sleeve of the airbag 40 that can be filled with gas. Preferentially, the peripheral seam 44 is siliconized (or sealed in another suitable manner), so that the airbag 40 is formed gas-tight.

For distributing a gas flow set free by the gas generator 30, a gas flow distributor 1 is provided. In order that the composed system gas generator 30/gas flow distributor 1 also behaves thrust neutral in case of a fire, the gas flow distributor 1 comprises a flexible sleeve H out of a flammable fabric. In case of a fire the gas flow distributor 1 is burned and the radial discharging of gas by the gas generator 30 assures the thrust neutrality.

The sleeve H of the gas flow distributor 1 directing or distributing the gas flow surrounds an internal space I of the gas flow distributor 1 through which the gas flow flows towards the internal space 41 of the airbag 40 and is composed according to FIGS. 3 to 6 out of at least four or five layers 51, 52, 53, 53', 54 lying on top of each other. Thereby, said four or five layers 51, 52, 53, 53', 54 are arranged in a way, that the part of the sleeve H, in which the gas outlet ports 31 reside, is correspondingly designed four-ply or five-ply. Hereby, the airbag 40 is securely protected against the eventually hot gases of the gas generator 30.

In order that the four or five layers 51, 52, 53, 53', 54 can be precisely aligned with respect to each other during production of the gas flow distributor 1, the layers 51, 52, 53, 53', 54 respectively comprise a through-opening 55, which in a state in which the layers 51, 52, 53, 53', 54 are positioned as intended, lie congruently on top of each other, namely preferably in a central region of the sleeve H. Eventually, the through-openings 55 can be engaged by a positioning tool for the purpose of positioning. The through-openings 55 merely serve for positioning of the layers 51, 52, 53, 53', 54 with respect to each other and are adapted and provided to be covered by an airbag layer 42 butting against the corresponding sleeve part T, T' in case of a gas flow distributor 1 being built-in an airbag 40, so that upon inflation of the airbag 40 no gas can escape through the through-openings 55 into the internal space 41 of the airbag 40.

The sleeve H is created out of the evenly outspread layers 51, 52, 53, 53', 54 lying on top of each other, by folding them onto each other along a fold axis 50 according to FIGS. 3 to 6, which fold axis 50 defines two sleeve parts T, T' which are mirror symmetrical with respect to the fold axis 50. Thus, the sleeve H comprises a boundary region 27 via which both sleeve parts T, T' are integrally connected to each other. The adjoining boundaries 25, 26 of the two sleeve parts T, T' are connected to each other by means of seam N which is eventually siliconized. The sleeve H formed in this way comprises a first hose-shaped section 10, which runs at a transition region D of the sleeve H under an acute angle W into a second hose-shaped section 20 of the sleeve H, so that the sleeve H can in particular form a V-shape. The above described through-openings 55 preferably lie in the transition region D of the sleeve H.

The first section 10 serves as a reception for an end section of the gas generator 30, which is inserted through an insertion opening 11 of the first section 10 into said section 10, so that its gas outlet ports 31 are positioned in the region of the innermost layer 54 of the sleeve H, wherein the first section 10 is designed to be arranged in a region of the airbag 40 protruding in a hose-shaped manner from the airbag 40, which is adapted and provided for receiving said first section 10.

The second section 20 extends in the internal space 41 of the airbag 40 along an—related to a state of the airbag 40 in which the airbag 40 is built in a motor vehicle—upper boundary 43 of the airbag 40 and thereby extends longitudinally along an extension direction 23, which, related to said built-in state of the airbag 40, extends along the longitudinal vehicle axis x.

For distributing the gas flow in two opposite directions (along the extension direction 23) the second section 20 of the sleeve H comprises two exhaust ports 21, 22 facing each other along the extension direction 23, through which gas leaving the gas generator 30 can get into the internal space 41 of the airbag 40. Thereby, the two exhaust ports 21, 22 can be associated to different regions of the airbag 40, e.g. different chambers. In case of a side airbag 40, the first or second section 10, 20 of the sleeve H can be arranged centrally at the airbag 40 along the longitudinal vehicle axis x, so that the two exhaust ports 21, 22 can discharge gas into a front or a rear region (related to the longitudinal vehicle axis x) of the airbag 40. Preferably, a first exhaust port 22 of the two exhaust ports 21, 22 faces the insertion opening 11 of the first section 10 along the first section 10, i.e., along the fold axis 50, while the second exhaust port 21 faces the first exhaust port 22 along the extension direction 23 of the second section 20. The insertion opening 11 as well as the exhaust ports 21, 22 are preferably formed by interruptions of the seam N, via which the two sleeve parts T, T' are circumferentially connected to each other (at least in sections).

For forming the sleeve H, the four or eventually five layers 51, 52, 53, 53', 54 are evenly outspread in a plane and are arranged such that they lie on top of each other. Here, each layer 51, 52, 53, 53', 54 is outspread in a way, that two halves of the respective layer being mirror symmetrical with respect to the fold axis 50 are defined, respectively, wherein a half is associated to the first sleeve part T and the other half is associated to the second sleeve part T', respectively. Thus, each of the layers 51, 52, 53, 53', 54 respectively forms a part of the opposing sleeve parts T, T' of the sleeve H of the gas flow distributor 1.

A first layer 51 which forms in a state of the sleeve parts T, T' in which the latter are folded onto each other an outer layer 51 of the sleeve H, comprises among the layers 51, 52, 53, 53', 54 the largest area. For producing the sleeve H said first layer 51 is evenly outspread and a second layer 52 is arranged on top of the first layer 51, so that the first layer 51 of the finished sleeve H is arranged in front of the first layer 51 as seen from the internal space I.

Thereby, the first layer 51 extends beyond the second layer 52 on both sides along the fold axis 50, whereas across the fold axis 50, opposing sections of the circumferential boundaries of the first and second layer 51, 52 lie on top of each other. Here, the two layers 51, 52 are formed essentially (i.e., except for regions 57 serving the positioning of the layers 51, 52) congruent, particularly in the region of the second section 20 which adjoins the second exhaust port 21.

Afterwards, a third layer 53 (being the smallest one with respect to surface area) is arranged on the second layer 52, so that said layer 53 is approximately positioned in the center with respect to the first layer 51 and the second layer 52. The third layer 53 is preferably formed (two-dimensionally) rectangular, so that at least the gas outlet ports 31 of the gas generator 30 are surrounded in the folded state of the two sleeve parts T, T' by the third layer 53. As seen from the internal space I of the gas flow distributor 1, the third layer 53 lies in front of the first and the second layer 51, 52.

In a variant of the sleeve H a further third layer 53' is provided, which is arranged between the first and the second layer 51, 52 as an intermediate layer, namely congruently with respect to the third layer 53. In the case of two third layers 53, 53' the sleeve H thus comprises altogether five layers 51, 52, 53, 53', 54.

Finally, an innermost fourth layer 54 is provided, which comprises two sections facing each other along the fold axis 50 and being connected to each other, wherein one of these two sections is arranged preferably congruently with respect to the third layer 53 and the other one of the two sections is essentially arranged congruently with respect to a section of the first layer 51 which contains the insertion opening 11 of the first section 10 of the sleeve H, wherein said fourth layer 54 (slightly) extends along the fold axis 55 beyond said section of the first layer 51 containing the insertion opening 11.

One or more openings 56 may be provided at the peripheries of the single layers 51, 52, 53, 53', 54, namely preferably at regions 57 of the single layers 51, 52, 53, 53', 54, respectively, which protrude from said layers 51, 52, 53, 53', 54 in the respective extension plane of the individual layer. These openings 56 serve for installation purposes, namely preferably for positioning of the single layers 51, 52, 53, 53', 54 during production of the gas flow distributor 1 or the airbag 40, in which the gas flow distributor 1 is used. For positioning of the layers 51, 52, 53, 53', 54 said openings 56 can be engaged by suitable tools (e.g. pins) or can be aligned with position markers, which are visible through the openings 56. In the Figures only one such opening 56 is shown exemplary along with an associated region 57 of the gas flow distributor 1.

After the layers 51, 52, 53, 53', 54 have been arranged as described above, said layers are connected to each other by means of two seams N', which respectively extend along a boundary running parallel to the fold axis 50 of the smallest layer 53, 53' regarding surface area. Afterwards, the sleeve parts T, T' of the sleeve H of the gas flow distributor 1 composed in this way are folded onto each other (see above).

For fastening the gas flow distributor 1 in the airbag 40 the gas flow distributor 1 (in case of a gas-tight airbag 40) can be sewn with a part of the airbag 40 outside of a gas-tight region of the airbag 40 or can be fastened to the airbag 40 by means of another suitable fastening means. So, the gas flow distributor 1 shown in FIGS. 1 to 6 is sewn via a flap 58, which protrudes in the region of the insertion opening 11 from the gas flow distributor 1 towards the peripheral seam 44 of the airbag 40, with said peripheral seam 44. Alternatively, the gas flow distributor 1 shown in FIGS. 7 to 10 is sewn with the airbag 40 by means of an additional seam N". The seam N" thereby connects at least a sleeve part T of the gas flow distributor 1 in the region of the insertion opening 11 of the first section 10 to an airbag part of the airbag 40. The further sleeve part T' can be mirror-invertedly connected to the other (opposing) airbag part of the airbag 40. Preferably, the additional seam N" runs at least in sections along a boundary of the first section 10 of the gas flow distributor 1, which delimits the insertion opening 11. In this way, it is assured, that the gas generator 30 upon insertion into the gas flow distributor 1 through the insertion opening 11 cannot be accidentally inserted into the airbag 40 missing the insertion opening 11.

It is also conceivable to clamp the gas flow distributor 1 together with the airbag 40 on the gas generator 30 (e.g. by means of a clamp enclosing the gas generator).

In case of an airbag 40 which is not gas-tight, the gas flow distributor can be simply sewn with the airbag 40 at a suitable position. Thereby, it is not important that the connection between the gas flow distributor 1 and the airbag 40 is gas-tight.

Since the sleeve H preferably consists of a flexible fabric, it expands upon inflation of the airbag 40, i.e., when gas flows through the sleeve H (due to the gas pressure). The forces acting on the sleeve H in this connection have to be taken up by the seam N, which holds the two sleeve parts T, T' together. In this respect, the seam N is exposed to high stresses particularly in the mouth region (transition region D) of the two sections 10, 20, namely in particular during the initial stage of the inflation of the airbag 40 when gas is explosively set free or generated by the gas generator 30.

Therefore, the seam N is enforced by additional releasable connections V in the form of tear seams in the transition region D of the two sections 10, 20, namely on the side of the two sections 10, 20 that delimit (enclose) the acute angle W. A first tear seam V thereby follows in sections the course of the seam N in the transition region D, wherein two additional tear seams V, which can cross each other, may cross said first tear seam V and may delimit together with the first tear seam V a triangle-shaped area, so that the transition region D of the sleeve H between the first and the second section 10, 20 is narrowed by said tear seams V. The tear seams can be doubled, i.e., designed out of two seams running parallel with respect to each other.

In addition, a further releasable connection of the two sleeve parts T, T' in the form of a further tear seam V' is provided, which runs in the extension direction of the first section 10 and thus on the one hand encloses the gas generator 30 (not shown in FIG. 7) in addition and on the other hand directs a gas flow set free by the gas generator 30 at first in the direction of the one exhaust port 22, that is aligned with the first section 10. Hereby, the gas flow initially receives—i.e., before tearing of said further tear seam V' due to the gas flow flowing through the sleeve H—a preferred direction towards the one exhaust port 22, which can be associated to a front or a rear region of the airbag 40 (with respect to the longitudinal vehicle axis x in case of a state of the airbag 40 in which the latter is built in a motor vehicle as intended).

Furthermore, the further tear seam V' protects a section of the seam N which connects the two sleeve parts T, T' to each other in the region of the first section 10. For this, the further tear seam V' may run along said section of the seam N.

Upon (explosive) inflation of the airbag 40, gas flows under high pressure from the first section 10 via the transition region D into the second section 20 of the sleeve H of the gas flow distributor 1, wherein the sleeve H expands (explosively), so that a force is induced into the tear seams V which causes the tear seams V to tear. Hereby, the tear seams V absorb force peaks upon inflation of the airbag 40 and therefore protect sections of the enduring seam N lying behind, which enduring seam N holds the sleeve parts T, T' together.

FIGS. 7 to 10 show a modification of the gas flow distributor 1 shown in FIGS. 1 to 6, wherein in contrast to FIGS. 1 to 6 the gas flow distributor 1 is not composed out of four or five layers 51, 52, 53, 53', 54, but out of two congruently formed layers 51, 52 lying on top of each other which in turn are folded onto each other along a fold axis 50 for forming the sleeve H.

Finally, the second section 20 of the gas flow distributor 1 according to FIG. 10 comprises two further exhaust ports 28, which are arranged along the seam N, so that gas can flow—with respect to a built-in state of the airbag 40—along the vertical vehicle axis z into the internal space 41 of the airbag 40, i.e. perpendicular to the gas flows leaving the exhaust ports 21, 22.

The priority application DE 20 2007 007 355.0, filed May 22, 2007 including the specification, drawings, claims and abstract, is incorporated herein by reference in its entirety.

What is claimed is:

1. A gas flow distributor for an airbag module for the specific distribution of gas released from a gas generator into an airbag upon inflation of the airbag, said gas flow distributor comprising a flexible sleeve through which the released gas flows upon inflation of the airbag and which comprises at least two sleeve parts out of a flexible material connected to each other by means of a seam, wherein the seam takes up forces which are exerted on the sleeve by the gas flowing through the sleeve, wherein an additional releasable connection of the two sleeve parts is provided at least in sections for taking up the forces exerted by the gas on the sleeve, the additional releasable connection cooperates with the sleeve for limiting the forces to be taken up by the seam such that said additional releasable connection is released when gas flows through the sleeve, the sleeve comprises a first section and a second section connected thereto such that gas can flow through the first section and into the second section, wherein the second section includes two opposing exhaust ports through which gas can enter an airbag the first section of the sleeve runs under an acute angle into the second section of the sleeve, and the additional releasable connection connects the two sleeve parts to each other in a transition region of the sleeve at which the first section of the sleeve runs into the second section of the sleeve, so that a majority of the gas flowing through the sleeve exits the gas flow distributor through one of the two exhaust ports before a release of said additional releasable connection.

2. The gas flow distributor according to claim 1, wherein the additional connection extends at least in sections along the seam.

3. The gas flow distributor according to claim 1, wherein an internal space formed by the sleeve forms an internal space of the gas flow distributor.

4. The gas flow distributor according to claim 3, wherein the additional connection of the two sleeve parts when viewed from the internal space of the gas flow distributor is arranged in front of the seam.

5. The gas flow distributor according to claim 1, wherein the first section is designed to receive the gas generator so that gas outlet ports of the gas generator are arranged in a part of the internal space of the gas flow distributor, which part is surrounded by the first section.

6. The gas flow distributor according to claim 1, wherein the first section comprises an insertion opening for receiving the gas generator through which the gas generator can be inserted into the first section.

7. The gas flow distributor according to claim 6, wherein the insertion opening is formed by an interruption of the seam.

8. The gas flow distributor according to claim 1, wherein the second section is adapted and provided for being arranged in an internal space of the airbag that can be filled with gas.

9. The gas flow distributor according to claim 1, wherein the second section is formed longitudinally extending along an extension direction.

10. The gas flow distributor according to claim 1, wherein the two exhaust ports face each other along the extension direction.

11. The gas flow distributor according to claim 1, wherein the exhausts ports are formed by interruptions of the seam, respectively.

12. The gas flow distributor according to claim 1, wherein the releasable connection is formed by a tear seam.

13. The gas flow distributor according to claim 1, wherein the seam is formed as one of the following seams:
a sewn seam,
a glue line, or
a welded seam.

14. The gas flow distributor according to claim 1, wherein each sleeve part comprises four layers lying on top of each other, so that the sleeve parts are formed four-ply at least in the region of the gas outlet ports of the gas generator.

15. The gas flow distributor according to claim 14, wherein the layers comprise a through-opening, respectively, for positioning the layers during production of the gas flow distributor, which through-openings lie congruently on top of each other when the layers take their intended positions with respect to each other.

16. The gas flow distributor according to claim 15, wherein the through-openings are arranged in the sleeve in a way, that they are covered in a state of the gas flow distributor in which the latter is arranged in an airbag as intended by an airbag layer of the airbag, so that no gas can escape through said through-openings out of the gas flow distributor upon inflation of the airbag.

17. The gas flow distributor according to claim 1, wherein each sleeve part comprises five layers lying on top of each other, so that the sleeve parts are formed five-ply at least in the region of the gas outlet ports of the gas generator.

18. The gas flow distributor according to claim 1, wherein the gas flow distributor comprises two exhaust ports, which face each other along an extension direction.

* * * * *